(12) United States Patent
Bishop et al.

(10) Patent No.: US 8,401,551 B2
(45) Date of Patent: Mar. 19, 2013

(54) METHOD OF OPERATING A COMMUNICATION SYSTEM

(75) Inventors: Craig Bishop, Middlesex (GB); Chenho Chin, Deerlijk (BE)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 12/574,251

(22) Filed: Oct. 6, 2009

(65) Prior Publication Data

US 2010/0087193 A1 Apr. 8, 2010

(30) Foreign Application Priority Data

Oct. 6, 2008 (GB) .................................. 0818243.8

(51) Int. Cl.
*H04W 72/00* (2009.01)
(52) U.S. Cl. ..................................... 455/435.1; 370/329
(58) Field of Classification Search .................. 370/225, 370/329, 280, 241; 455/450
See application file for complete search history.

(56) References Cited

U.S. PATENT DOCUMENTS

2010/0165836 A1* 7/2010 Wahlqvist et al. ............ 370/225

* cited by examiner

*Primary Examiner* — Phuoc Doan
(74) *Attorney, Agent, or Firm* — Jefferson IP Law, LLP (57) ABSTRACT

A method of operating a communication system is provided. The communication system comprises a NetWork (NW) and User Equipment (UE), a Non Access Stratum (NAS) via which the NW and UE communicate with each other, and an Access Stratum (AS) providing a physical connection to enable the NAS communication between the NW and UE to be achieved, the physical connection including a wireless radio link to the UE. The method includes sending information from the NW to the UE to determine at least one action of the UE in response to a failure of a radio link to the UE, detecting a Radio Link Failure (RLF), in response to the detecting of the RLF, deciding on an action to be performed by the UE according to the received information, and performing, by the UE, the decided action.

11 Claims, 8 Drawing Sheets

METHOD OF OPERATING A COMMUNICATION SYSTEM

PRIORITY

This application claims the benefit under 35 U.S.C. §119(a) of a patent application filed on Oct. 6, 2008 in the United Kingdom Intellectual Property Office and assigned Serial No. 0818243.8, the entire disclosure of which is hereby incorporated by reference.

BACKGROUND OF THE INVENTION

1. Field of the Invention

The present invention relates to a telecommunications system. More particularly, the present invention relates to a method and apparatus for recovering a radio link after Radio Link Failure (RLF) in a telecommunications system.

2. Background to the Invention:

Communication systems (which may also be described as telecommunications systems) that provide wireless connections to mobile User Equipment (UE) are well known and have a variety of configurations. Research and development of communication systems is ongoing, especially in the field of technical specifications for so-called Third Generation Partnership Project (3GPP) systems.

In the 3GPP systems, communication between a UE and a Core Network (CN or NW) is in a so-called Non-Access Stratum (NAS) (in other words, communication is at the NAS level) wherein an Access Stratum (AS) provides services for the NAS. One such service that the AS provides, and seeks to maintain, is a physical connection to enable the NAS layer communication between the CN and the UE. This physical connection includes a radio link to the UE (i.e., a wireless link). However, an issue arises in the event of a Radio Link Failure (RLF). More particularly, an issue arises regarding how the system should respond to an RLF, and what steps, if any, should be taken in order to re-establish a connection.

The Radio Resource Control (RRC) re-establishment procedure after RLF or handover failure is not determined yet in 3GPP Long Term Evolution (LTE). One possibility to address RLF or handover failure, after detection at the lower layer, is for the UE to take the following actions:

1. The UE starts a timer T311 and performs cell selection.
2. If the UE finds a suitable Evolved Universal Terrestrial Radio Access (E-UTRAN) cell (i.e., an accessible cell having sufficient radio quality), the UE initiates a re-establishment procedure by sending the RRC Connection Re-establishment Request message.
3. If an enhanced Node B (eNB) cell receiving the RRC Connection Re-establishment Request is "prepared" (i.e., either was the source cell or a cell that was prepared by the source cell with the UE context through the handover preparation procedure), the re-establishment procedure succeeds.
4. If the eNB cell receiving the RRC Connection Re-establishment Request is not "prepared", the UE is rejected and pushed back to RRC_IDLE. Further connection recovery is left to NAS.
5. If the UE cannot find a suitable E-UTRAN cell, the UE can search for UTRAN/GSM/EDGE Radio Access Network (GERAN) cells. If the UE finds a suitable UTRAN/GERAN cell, the UE returns to RRC_IDLE. Further connection recovery is left to (UTRAN/GERAN) NAS.
6. If the UE cannot find a suitable cell before T311 expiry, the UE returns to RRC_IDLE mode.

In the event that the UE reaches steps 4, 5 or 6, it is expected that the connection would be recovered by the NAS (e.g., by NAS initiating a new NAS Service Request procedure). However, this is only likely if the UE had pending Up Link (UL) data. In the event that there was no pending UL data, but there was Down Link (DL) data in the network side, the NAS recovery procedure will not be triggered. Hence, one possible option would be to indicate the specific case of radio failure to NAS, so that NAS can initiate the recovery procedure in both cases (i.e. whether or not there was UL data remaining to be sent). Note that after step 5, it is also expected that the NAS will recover the connection by an inter-RAT recovery procedure.

A possibility, involving NAS specific recovery, is that the NAS can, after recovery from RLF (made known to the NAS by the AS) trigger a Service Request or a Tracking Area Update (TAU)_Request to ensure that the connection to the network is reestablished.

The main driver for this technique would be that the network might have DL data waiting to send to the UE. At present (that is, according to the current state of 3GPP discussions) the NAS, after RLF, will remain in IDLE (i.e. an idle mode, or idle state) if there is no UL data to send. The UE is in IDLE mode when no NAS signalling connection between the UE and the network exists. Only if the UE has UL data to send will the NAS autonomously perform or trigger a request for radio bearers after recovery from RLF. So, in the event that there is DL data, that DL data will only reach the UE after a paging procedure. That may be unacceptable to certain operators because it involves too long a delay or due to other problems.

In addition to the above scenario, another possible scenario is as follows:

1. Cell A and cell B are located within the same Tracking Area (TA) and both cells are connected to same eNB and Mobility Management Entity (MME).
2. UE is in cell A, in a media session with the network and data exchange is ongoing.
3. There is a radio level failure and RRC attempts to recover.
4. RRC, in an attempt to recover, performs cell reselection onto cell B.
5. During this period, there is no UL data pending. There is no TAU, as cell A and cell B are within the same TA.
6. There is a network equivalent of T311 and that network timer is still running. Until the network equivalent of T311 expires, the MME is not aware that the UE is no longer in cell A.
7. DL data arrives at the network. The network will pass the DL data to the eNB to deliver through cell A.

In this scenario, even though the UE has recovered itself, it is in a new radio area but the network mistakenly recognizes the UE as being in the old (previous) radio area. In this scenario, the paging from the NW to deliver DL data will fail and the paging would be escalated to include a wider radio area.

From the above examples and discussion of the identified problems, it will be appreciated that some of these techniques post-RLF may result in an unacceptable service for the user. Hence, an NAS solution (done by triggering Service Request, TAU or Routing Area Update (RAU)) (in other words a NAS specific recovery) after detection of an RLF may provide the means to overcome loss of this possible anticipated DL data, and hence provide improved user services.

On the other hand, such automatic use of NAS specific recovery also has disadvantages associated with it, as will be appreciated from the following:

1. The network equivalent of T311 (for sake of description called T311-nw) can be properly configured to allow the NW to know if the UE is no longer in the previous radio area (i.e. the S1 connection can be taken down upon expiry of T311-nw). So, subsequent paging will immediately include a wider area.
2. The paging and UE responding will only take approximately 2 or 3 seconds and services will not be severely affected. For Guaranteed Bit Rate (GBR) services, it is likely that UL data will be transmitted very soon and that in itself will cause the UE to trigger a Service Request. On the other hand, non-GBR services can, by their nature, suffer seconds of interruption.
3. The complexities may not outweigh the gain. The gain may be a matter of 6 to 8 seconds compared to 13 seconds if nothing is done. It could be argued that if T311-nw is set correctly, to 5 seconds, for example, then with 2-3 seconds of paging delay that will only take 7 to 8 seconds, and that is comparable to doing all the complexities to get to 6 to 8 seconds.
4. The performance of NAS signalling, be it a Service Request, a TAU request or an RAU request, is in anticipation of there being DL data to be transmitted to the UE. There is no certainty, however, that there will be DL data.
5. Performing the NAS signalling after detection of a RLF will cause a large signalling spike in certain conditions, for example in the situation where a trainload of users go into and then come out of a tunnel.

Thus, automatic performance of NAS restoration procedures after a RLF can have disadvantages associated with it and adoption of such a procedure may not suit all operators and all situations. Accordingly, there is a need for an improved method for recovering from an RLF.

SUMMARY OF THE INVENTION

An aspect of the present invention is to address at least the above-mentioned problems and/or disadvantages and to provide at least the advantages described below. Accordingly, an aspect of the present invention is to provide a method for improved recovery from a Radio Link Failure (RLF).

According to an aspect of the present invention, a method of operating a communication system comprising a NetWork (NW) and User Equipment (UE), a Non Access Stratum (NAS) via which the NW and the UE communicate with each other, and an Access Stratum (AS) providing physical connections to enable the NAS communication between the NW and the UE to be achieved, the physical connections including a wireless radio link to the UE, is provided. The method includes sending information from the NW to the UE to determine at least one action of the UE in response to a failure of a radio link to the UE, detecting a Radio Link Failure (RLF), in response to the detecting of the RLF, deciding on an action to be performed by the UE according to the information, and performing, by the UE, the decided action.

According to another aspect of the present invention, a method of operating a communication system comprising a core NetWork (NW), User Equipment (UE), and an Access Network (AN) providing a physical connection to enable the communication between the NW and the UE to be achieved, the physical connection including a wireless radio link to the UE, is provided. The method includes sending information from the NW to the UE to determine at least one action of the UE in response to a failure of a radio link to the UE detecting an RLF, in response to the detecting of the RLF, deciding on an action to be performed by the UE according to the information, and performing, by the UE, the decided action.

According to yet another aspect of the present invention, a method of operating a communication system comprising a NetWork (NW) and a User Equipment (UE), a Non Access Stratum (NAS) via which the NW and the UE communicate with each other, and an Access Stratum (AS) providing a physical connection to enable the NAS communication between the NW and the UE to be achieved, the physical connection including a wireless radio link to the UE, is provided. The method includes detecting a Radio Link Failure (RLF) by the AS, informing the NAS of the RLF, determining if a message is received by the UE regarding recovery by the NAS from the RLF, if it is determined that the message regarding recovery by the NAS from the RLF is received, determining if the received message indicates that recovery by the NAS from the RLF is permitted, and, if it is determined that the recovery by the NAS from the RLF is permitted, performing a recovery from the RLF by the NAS.

It will be appreciated that, in its broadest sense, the inventive method is not limited to any particular action or inaction by the UE. Furthermore, exemplary embodiments of the invention may utilize the concept of remote setting or configuration of the UE (in terms of what action the UE performs in response to a RLF) by the NW.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
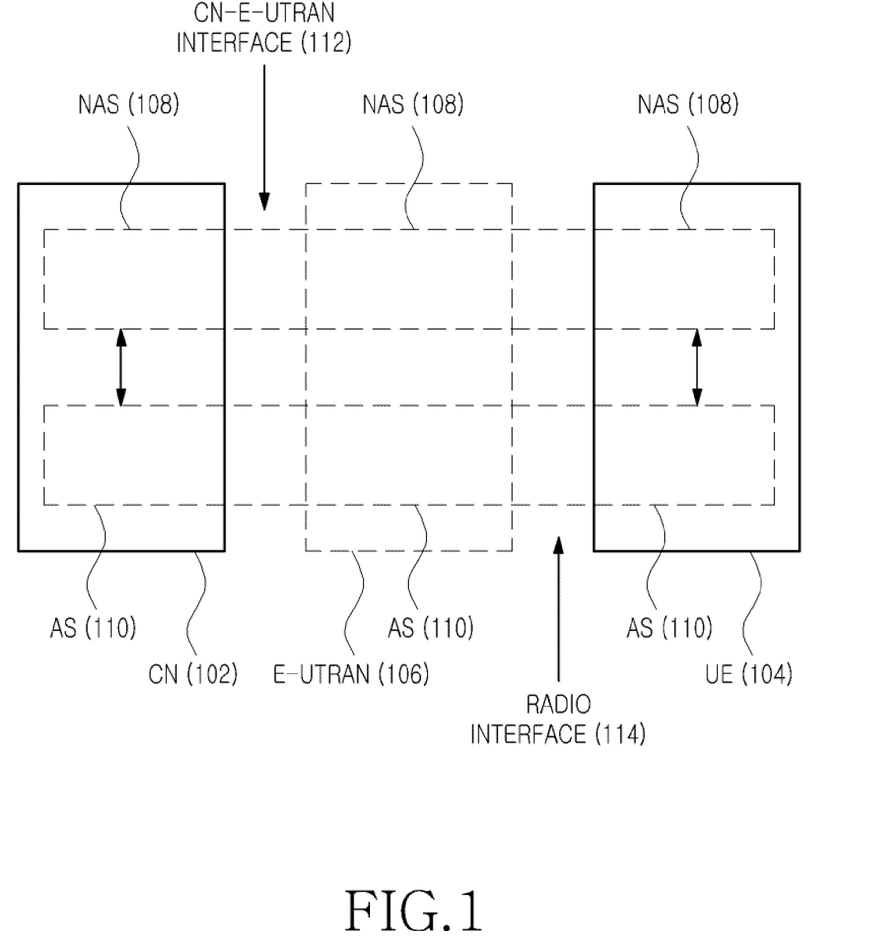
FIG. 1 is a schematic representation of a communication system according to an exemplary embodiment of the present invention.

FIG. 1 is a schematic representation of a communication system according to an exemplary embodiment of the present invention.

Referring to FIG. 1, a communication system comprises a Core Network (CN) 102 (which, in certain exemplary embodiments, may be described as a NetWork NW), a User Equipment (UE) 104, and an Evolved Universal Terrestrial Radio Access Network (E-UTRAN) system 106 between the CN 102 and the UE 104. Communication between the UE 104 and the CN 102 is in a Non-Access Stratum (NAS) 108. An Access Stratum (AS) 110 provides services for the NAS 108. That is, the AS 110 provides a physical connection 114 (i.e., radio interface) to enable the NAS communication between the NW 102 and the UE 104. The physical connection 114 includes a wireless radio link to the UE 104 (in other words, the AS 110 provides a physical radio interface between the UE 104 and E-UTRAN 106 in this example). The AS 110 also provides a physical link for a CN/E-UTRAN interface 112.

In an exemplary implementation, the system shown in FIG. 1 is arranged to perform a method comprising:
1. sending information from the NW to the UE to determine at least one action of the UE in response to the failure of a radio link to the UE;
2. detecting a Radio Link Failure (RLF);
3. in response to detecting the RLF, deciding on an action to be performed by the UE according to the received information; and
4. performing, with the UE, the decided action.

The decided action may, for example, include one or more NAS signalling recovery actions or procedures. Whether NAS signalling recovery is performed, or at least triggered, may thus be dependent upon what information the UE has previously received from the network. The network may have sent information (e.g., a signal) to inhibit/prevent NAS signalling recovery after an RLF, or alternatively to enable such action. Thus, certain exemplary embodiments provide methods to limit the NAS signalling recovery after an RLF for operators who either do not want it or see it as a disadvantage. These methods provide the network with means to remotely set or configure the UE, in terms of what action it takes after detection of a RLF by the AS. In other words, certain exemplary embodiments provide a way to enable or disable this NAS signalling recovery after detection of RLF.

Figure 2:
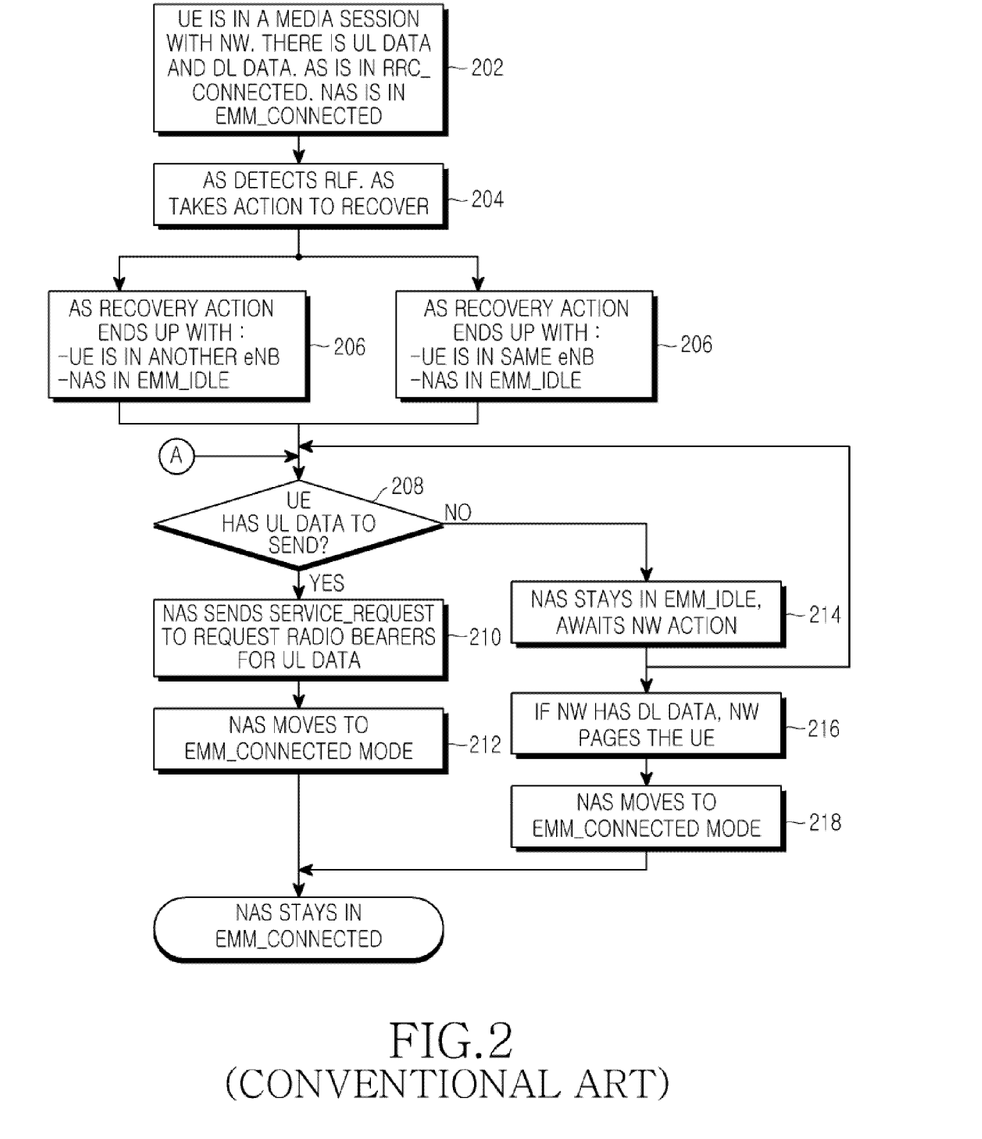
FIG. 2 is a flowchart illustrating a conventional method of operating a communication system.

FIG. 2 is a flowchart illustrating a conventional method of operating a communication system.

Referring to FIG. 2, the UE is in a media session, including the sending/receiving of UL/DL data, with a network in step 202. The AS is in Radio Resource Control (RRC)_connected mode, and the NAS is in Evolved Mobility Management (EMM)_connected mode. The UE is in the RRC_connected mode when an RRC connection has been established. The UE is in the EMM_connected mode when an NAS signalling connection between the UE and the network is established. In step 204, the AS detects RLF and takes action to recover. In step 206, the AS recovery action ends according to modes of the UE and the NAS.

If it is determined that the UE has UL data to send in step 208, the NAS sends a SERVICE_REQUEST message to request radio bearers for UL data in step 210. In step 212, the NAS moves to EMM_connected mode. The UE is in the EMM_connected mode when an NAS signalling connection between the UE and the network is established. The term EMM_connected mode used in the present description may correspond to the term ECM_connected state used in 3GPP TS 23.401. If it is determined in step 208 that the UE does not have UL data to send, the NAS stays in EMM_IDLE to await a network action in step 214 and then returns to step 208. If the network has DL data, the network pages the UE in step 216 and the NAS moves to EMM_connected mode in step 218.

Figure 3:
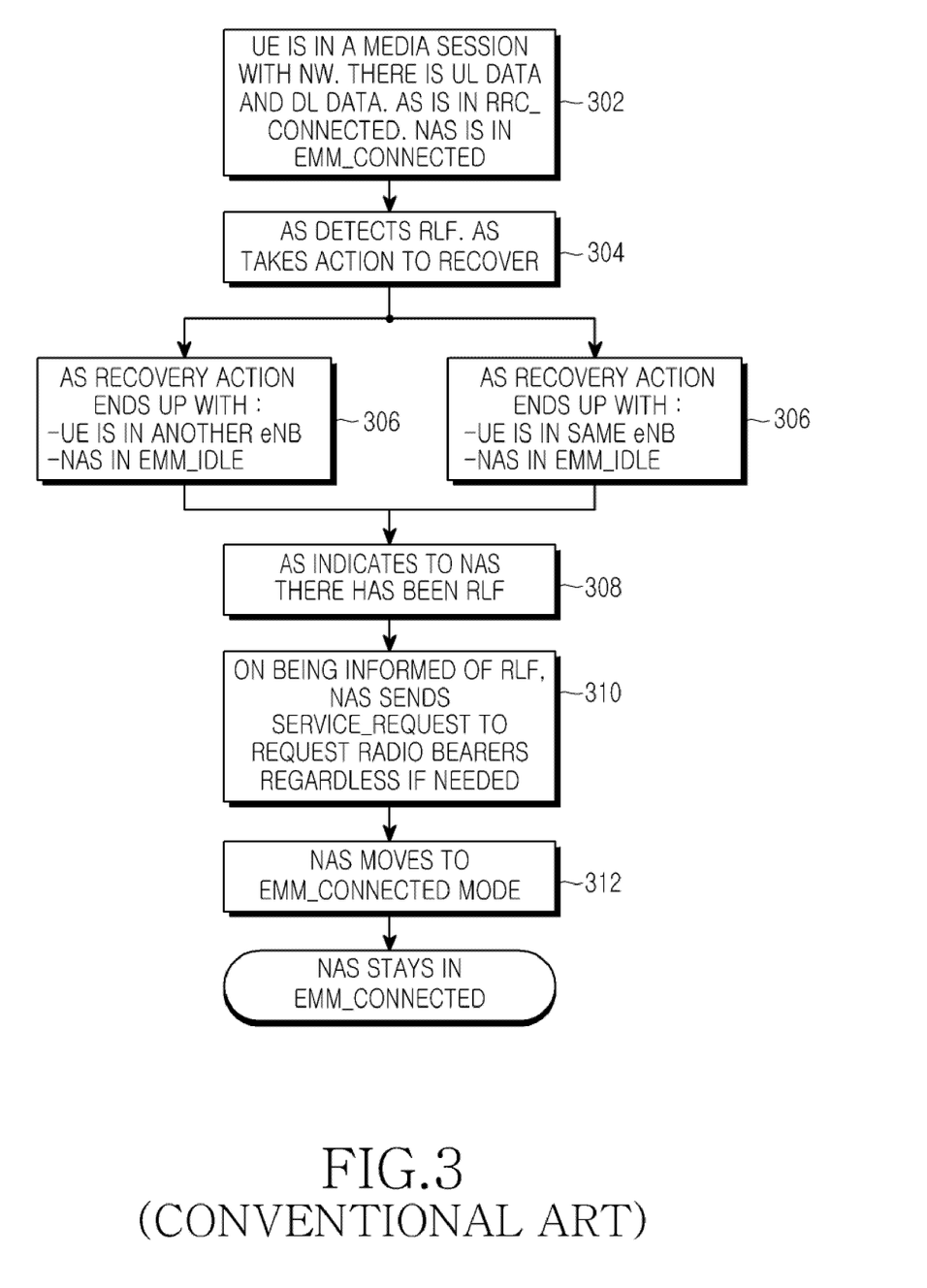
FIG. 3 is a flowchart illustrating a possible alternative method of operating a communication system.

FIG. 3 is a flowchart illustrating a conventional method of operating a communication system.

Referring to FIG. 3, NAS specific recovery is automatically performed after an RLF. In this figure only the triggering of the SERVICE_REQUEST message is illustrated for ease of description. More specifically, FIG. 3 illustrates a technique for an NAS specific recovery by NAS signalling. That is, the SERVICE_REQUEST message is unconditionally triggered by the UE. A disadvantage of this method is the unwarranted and undesirable signalling load. Moreover, this way of NAS specific recovery is done in anticipation that there will be DL data, which might not be the case at all. Accordingly, allocated radio resources will be wasted.

In step 302, the UE is in a media session with a network including the sending/receiving of UL/DL data. The AS is in RRC_connected mode, and the NAS is in EMM_connected mode. The UE is in the RRC_connected mode, when an RRC connection has been established. The UE is in the EMM_connected mode when an NAS signalling connection between the UE and the network is established. In step 304, the AS detects RLF and takes action to recover. In step 306, the AS recovery action ends according to modes of the UE and the NAS.

In step 308, the AS indicates to the NAS that there has been an RLF. In step 310, on being informed of the RLF, the NAS sends a SERVICE_REQUEST message to request radio bearers regardless if needed. In step 312, the NAS moves to EMM_connected mode.

In contrast to the conventional methods shown in FIGS. 2 and 3, exemplary embodiments of the invention are able to allow networks and operators to have a choice as to whether there will be an NAS specific recovery. In giving the network and the operator the choice, the network operator can choose to accept the potential disadvantages and thus risks of NAS specific recovery.

Figure 4:
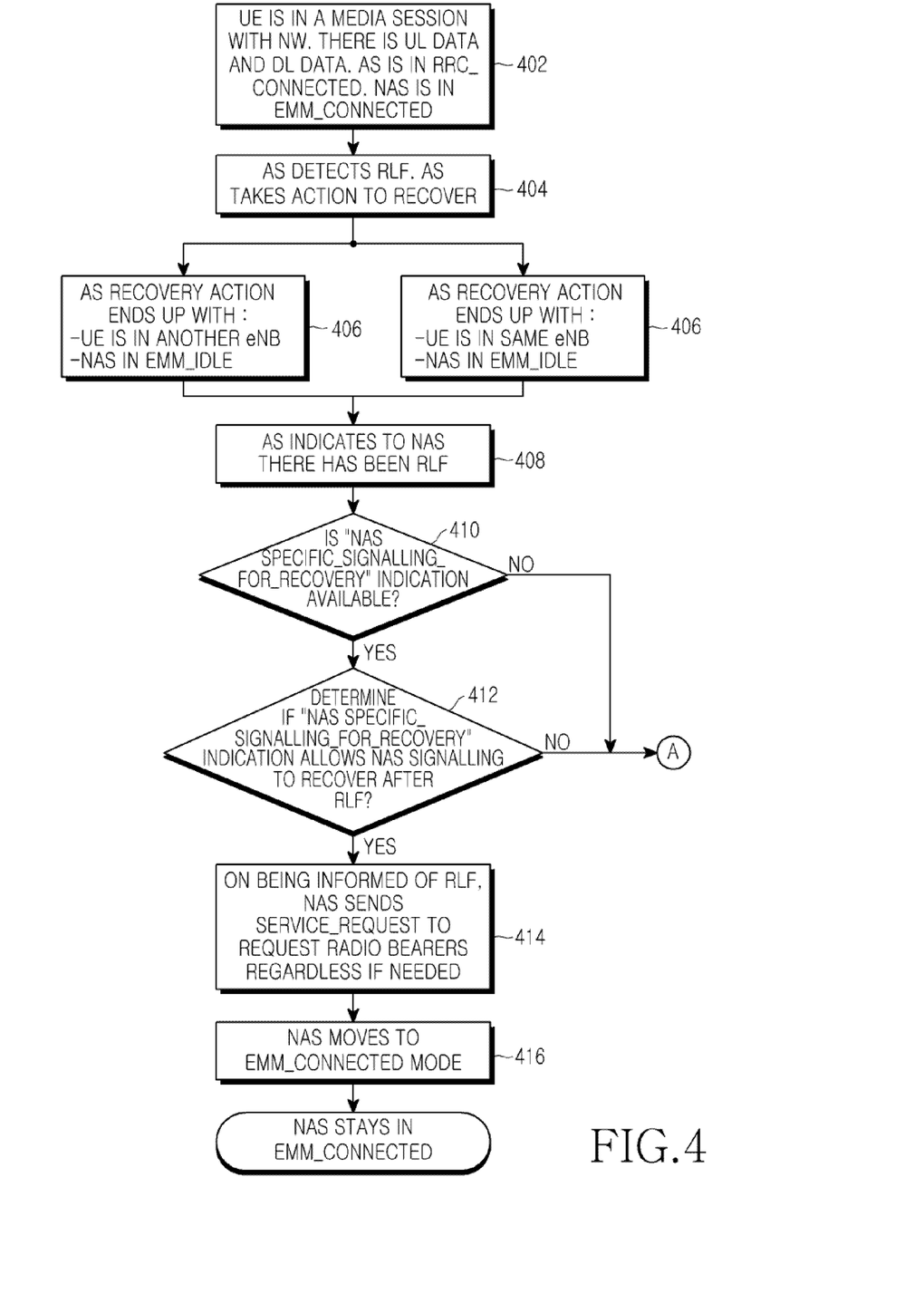
FIG. 4 is a flowchart illustrating a method of operating a communication system according to an exemplary embodiment of the present invention.
Figure 5:
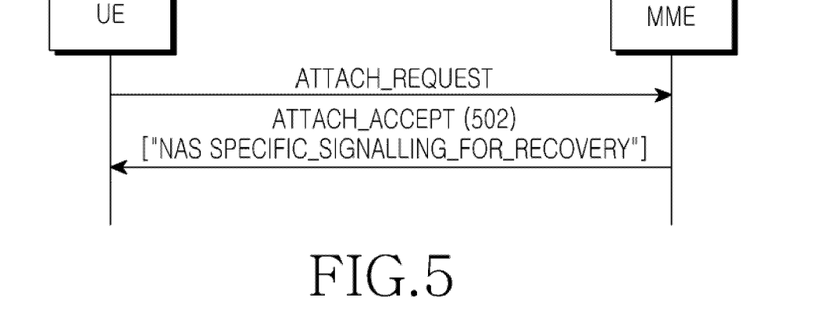
FIGS. 5 to 9 illustrate methods for sending messages according to exemplary embodiments of the present invention.
Figure 6:
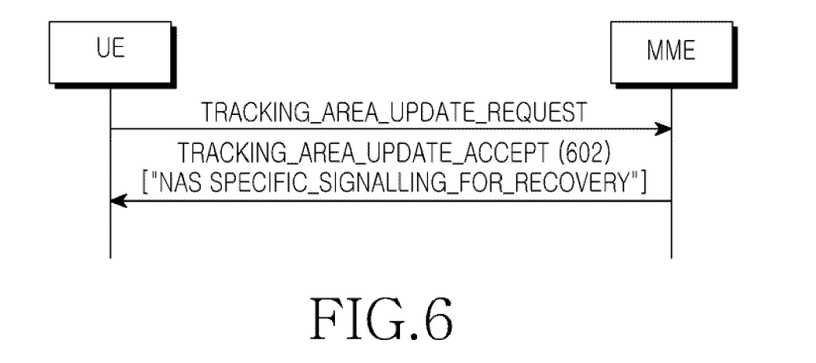
Figure 7:
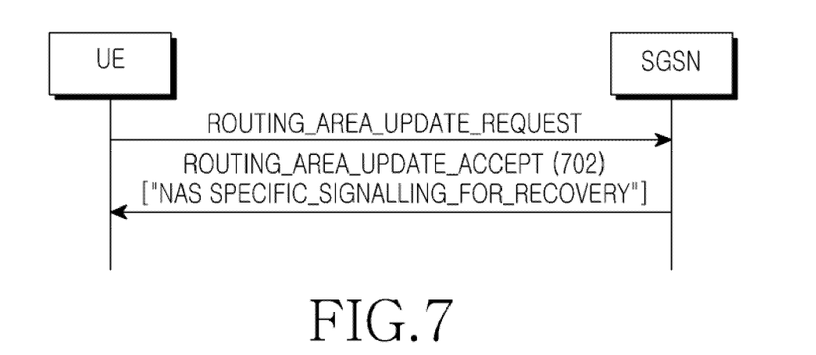
Figure 8:
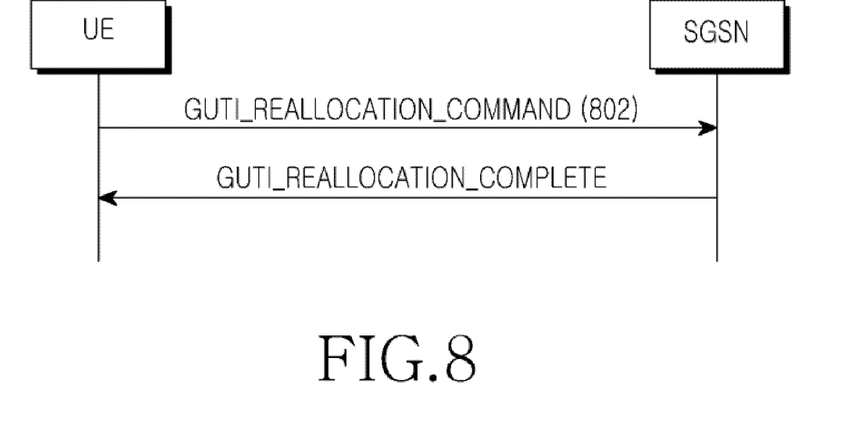

FIG. 4 is a flowchart illustrating a method of operating a communication system according to an exemplary embodiment of the present invention.

Referring to FIG. 4, steps 402, 404, 406 and 408 are substantially the same as steps 302, 304, 306 and 308, respectively, of FIG. 3 and therefore will not be described here for sake of convenience. In step 410, the UE determines if the network provides an indication to the UE regarding whether the UE can perform NAS specific recovery for recovery from an RLF. For example, the UE determines whether it has received an NAS_specific_signalling_for_recovery message indicating that NAS specific recovery is available.

It is to be understood that the indication "NAS specific_signalling_for_recovery" is merely for example and may be termed something else.

If it is determined in step 410 that an indication message has been provided, in step 412, the UE determines if the "NAS specific_signalling_for_recovery" message indicates that the UE can perform NAS specific recovery after recovery from an RLF.

If it is determined in step 412 that the "NAS specific_signalling_for_recovery" message indicates that NAS specific recovery is allowed, then the UE proceeds to step 414 and subsequent steps in which the UE can trigger NAS specific recovery after recovery from RLF. Steps 414 and 416 are substantially the same as steps 310 and 312, respectively, of FIG. 3 and will not be described here for sake of convenience.

On the other hand, if it is determined in step 410 that the network does not provide an "NAS specific_signalling_for_recovery" message indicating that NAS specific recovery is allowed or, if it is determined in step 412 that the "NAS specific_signalling_for_recovery" message from the network indicates that the UE is not allowed to perform NAS specific recovery after recovery from RLF, then the NAS will not perform NAS specific recovery after recovery from the RLF. In either of these situations, the UE executes a procedure substantially the same as the process of step 208 and subsequent steps of FIG. 2.

FIG. 4 thus shows an exemplary embodiment in which an indication to allow or disallow NAS specific recovery is provided to the UE by the NW.

FIGS. 5 to 9 illustrate methods for sending messages according to exemplary embodiments of the present invention.

In exemplary embodiments of the present invention, the NW can provide the information (indication) to the UE in a variety of ways. Exemplary methods of providing this "NAS_specific_signalling_for_recovery" indication are shown in FIGS. 5 to 8.

Referring to FIGS. 5-8, various methods of providing the information for decision-making purposes (e.g. the indication of need for NAS signalling recovery) are illustrated. For example, any of an Attach Accept message, a TAU Accept message, an RAU Accept message, a GUTI Reallocation message and other appropriate NAS signalling may provide the "NAS specific_signalling_for_recovery". These messages will indicate to the UE whether the NAS signalling to recover connection to NW after RLF is to be done. In other words, the information can be included in/sent with any of an Attach Accept message 502 from an MME, a TAU Accept message 602 from an MME, an RAU Accept message 702 from a Serving GPRS Support Nodes (SGSN), a Globally Unique Temporary Identity (GUTI) Reallocation message 802 from an SGSN and the like.

Certain exemplary embodiments include the providing of the indication at the AS level.

In exemplary methods below, this indication given at the AS level is conveyed to the NAS through implementation of specific means and will not be described in detail.

In certain exemplary embodiments the indication is provided over a broadcast channel or by AS signalling.

Figure 9:
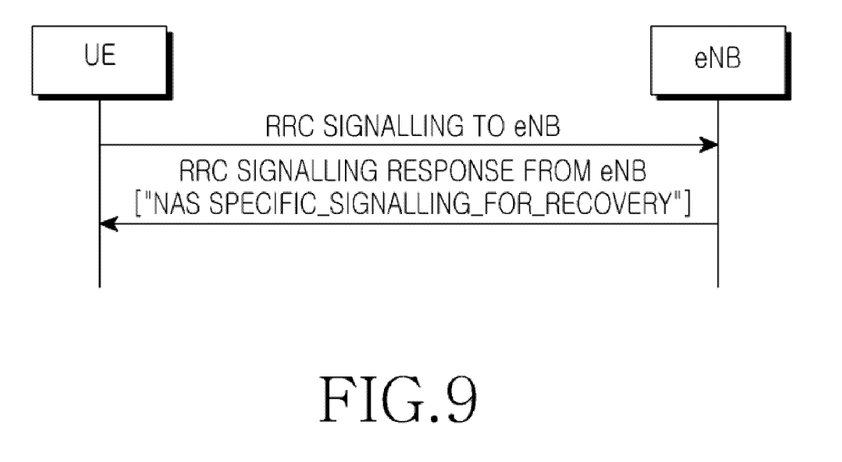

Referring to FIG. 9, RRC signalling provides the "NAS specific_signalling_for_recovery" indication to the AS of the UE once received from an eNB in response to RRC signalling from the UE to the eNB. After receipt, the AS of the UE will pass this "NAS specific_signalling_for_recovery" indication up to the NAS to indicate whether NAS signalling to recover the connection is required after detecting an RLF. The internal AS to NAS communications are subject to implementation dependencies and are not discussed in further detail here.

In certain exemplary embodiments, the information (e.g., the indication) is provided to the UE through an Over The Air (OTA) mechanism. By an OTA mechanism, an indication can be provided to the UE. Such an OTA mechanism, which may be used in an exemplary embodiment of the present invention, may include, but is not limited to, the following:

1. Short Messaging Service (SMS)
2. Open Mobile Alliance Device Management (OMA DM)

It will be appreciated from the above that certain NAS restoration procedures following an RLF indication from the AS may not involve the UE first returning to idle mode. That is, in certain exemplary embodiments, the UE may return to idle, but in alternative exemplary embodiments it does not. A possible reason for not returning to idle mode is that there are circumstances (e.g., Guaranteed Bit Rate (GBR) DL streamed video via User Datagram Protocol (UDP)) in which the UE will have no data to send in the UL direction, and so will not immediately send a SERVICE_REQUEST message to re-establish the dedicated Enhanced Packet Core (EPC) Bearer following the RLF. In that case it could be argued that, as the UE would return to idle mode, it would be necessary for the network to page the UE (potentially via a cell in which the UE is no longer present) and then for the UE to re-establish the RRC connection before the downlink data flow can resume. This could lead to unacceptable data interruption times for GBR services and unsatisfactory user experience. Furthermore, paging might not reach the UE if the UE has moved to another cell and the NW is not (yet) informed. So paging escalation is needed, adding a further few seconds of delay.

A concern is that if the UE automatically invokes NAS restoration procedures on receiving the RLF indication from the AS, this could lead to a spike in signalling to the network if a large group of users in the same cell simultaneously lose coverage and then all attempt restoration procedures at the same time. One example is that of a train load of users entering and leaving a tunnel. It is very difficult for the NAS to determine what kind of service was actually in use at the time of the RLF. The Radio Access Bearer Manager (RABM) may be aware of the type of service but the RABM does not have an indication of the RLF. So the entity that does know of the RLF does not know of the service used, while the entity that does know of the service in use does not know that an RLF has occurred.

Certain exemplary embodiments of the invention give the operators (the network, or core network) a chance to control whether the UE should automatically attempt NAS restoration procedures on detection of an RLF from the AS, and provide that this indication may be communicated to the UE via a system information broadcast, explicit NAS signalling, OTA provisioning and the like.

It will be appreciated that certain exemplary embodiments of the invention are 3GPP specific. However, exemplary embodiments may also relate to other wireless systems that effectively comprise both an Access Network and a Core Network. The Non-Access Stratum is essentially a generic term to describe the stratum that encapsulates the layer 3 (and in some cases layer 4) protocols used for communication between the UE and the Core Network. Likewise, the Access Stratum is a generic term used to describe the stratum that encapsulates the Layer 2/Layer 3 protocols used for communication between the UE and the Access Network and between the Access Network and the Core Network.

The 3GPP specification TS 23.101 defines the Access Stratum as " . . . the functional groupings consisting of the parts in the infrastructure and in the user equipment and the protocols between these parts being specific to the access technique (i.e. the way the specific physical media between the User Equipment and the Infrastructure is used to carry information). The Access Stratum provides services related to the transmission of data over the radio interface and the management of the radio interface to the other parts of Universal Mobile Telecommunications System (UMTS). The Access Stratum includes the following protocols:

1. Mobile Termination—Access Network. This protocol supports transfer of detailed radio-related information to co-ordinate the use of radio resources between the MT and the access network.
2. Access Network—Serving Network. This protocol supports the access from the serving network to the resources provided by the access network. It is independent of the specific radio structure of the access network."

The Non-Access Stratum is defined implicitly in TS 23.110 (UMTS access stratum services and functions) where it is used to describe the boundaries of the Access Stratum.

Other exemplary methods embodying the invention may be implemented in systems comprising a UE, a Core Network (CN) and an Access Network (AN). In such exemplary embodiments, the CN sends the information to the UE to determine the course of action on detection of RLF and the RLF is detected by the UE based on communication (or lack thereof) between it and the AN.

Figure 10:
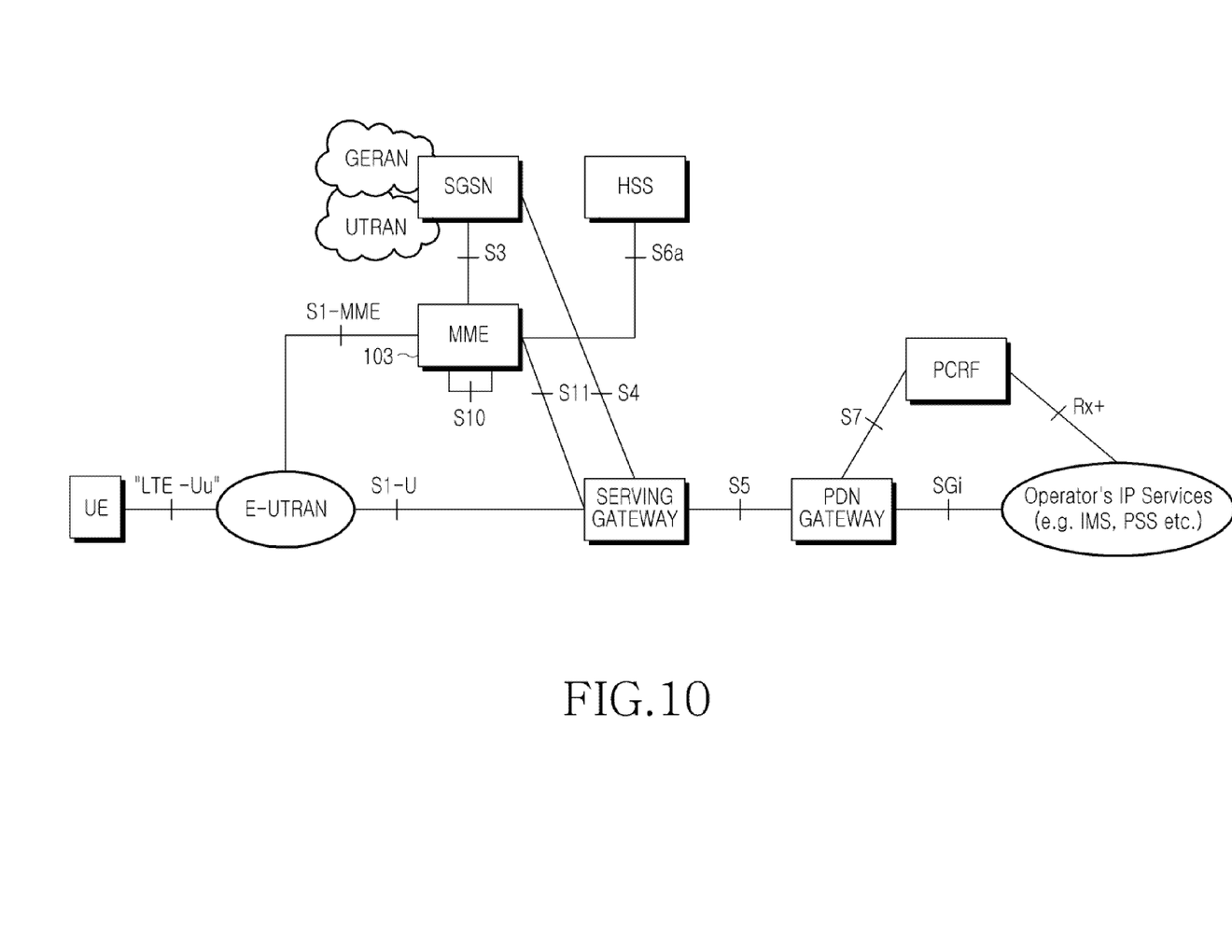
FIGS. 10 and 11 illustrate the System Architecture Evolution (SAE)/Long Term Evolution (LTE) reference architecture, as defined by 3GPP, and in which methods embodying the invention may be implemented.
Figure 11:
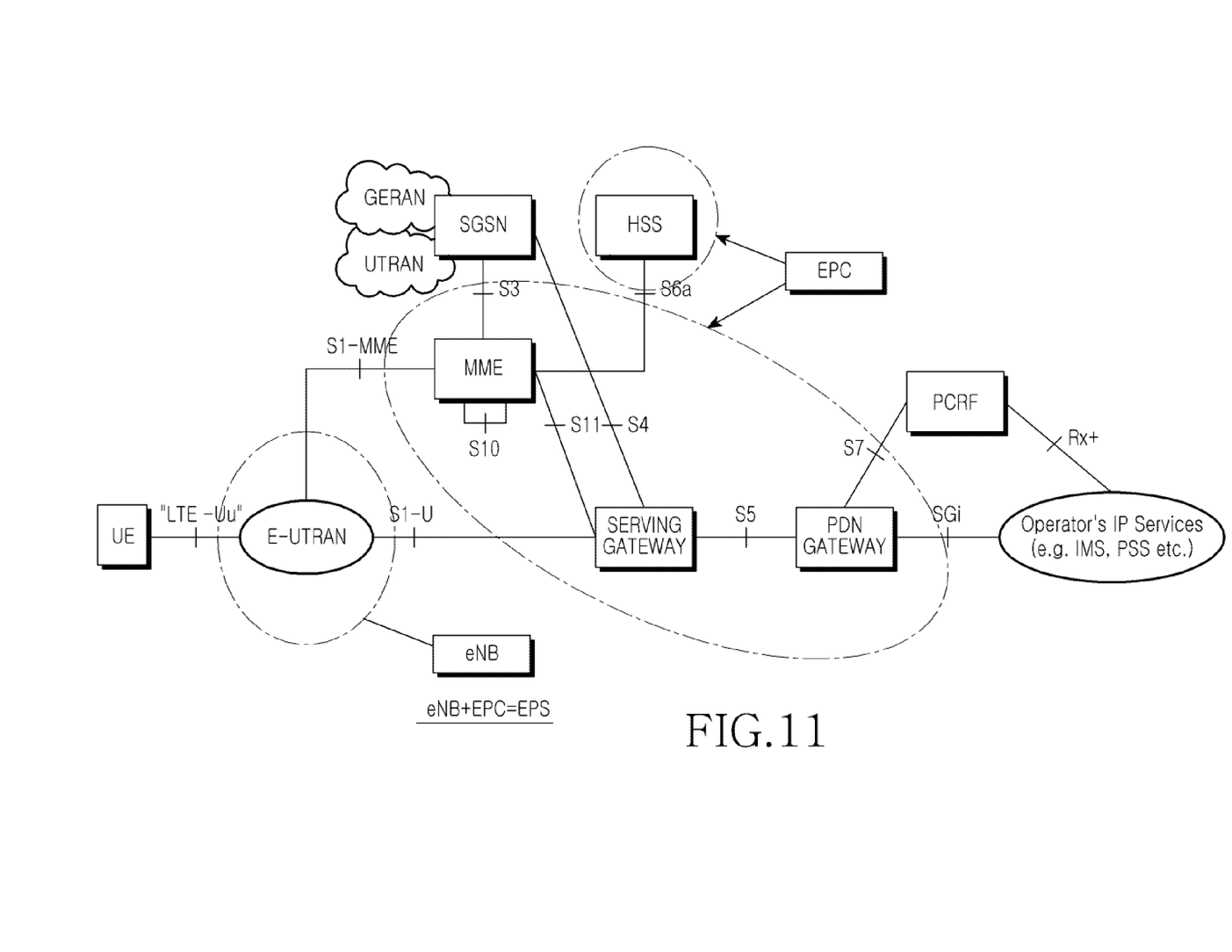

As further background to the invention, FIGS. 10 and 11 illustrate System Architecture (SAE)/Long Term Evolution (LTE) Reference Network Architecture.

FIGS. 10 and 11 below—extracted from TS 23.401—provide an illustration of the SAE/LTE reference architecture as defined by 3GPP.

Referring to FIGS. 10 and 11, the 2G GSM/GPRS system (GERAN+SGSN) and the 3G UMTS system (UTRAN+SGSN) are illustrated. Through this illustration, one is able to see the "link-up" from/to the 3GPP 2G and 3G system and 3GPP's SAE/LTE.

The ideas, methods and claims described herein refer to EPC and an Enhanced Packet System (EPS) and more particularly refer to possible Interworking Functions within the EPC. To help visualize the scope of EPC, FIG. 11 is provided. Regarding FIG. 11, it should be noted that EPC also encompasses the HSS.

It will be appreciated that exemplary embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement embodiments of the present invention. Accordingly, exemplary embodiments provide a program comprising code for implementing a system or method as claimed in any one of the claims of this specification and a machine-readable storage storing such a program. Still further, such programs may be conveyed electronically via any medium such as a communication signal carried over a wired or wireless connection and exemplary embodiments suitably encompass the same.

Throughout the description and claims of this specification, the words "comprise" and "contain" and variations of the words, for example "comprising" and "comprises", mean "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, exemplary embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a communication system comprising a NetWork (NW) and a User Equipment (UE), a Non Access Stratum (NAS) via which the NW and the UE communicate with each other, and an Access Stratum (AS) providing a physical connection to enable the NAS communication between the NW and the UE to be achieved, the physical connection including a wireless radio link to the UE, the method comprising:

sending information from the NW to the UE to determine at least one action of the UE in response to a failure of a radio link to the UE;
detecting a Radio Link Failure (RLF);
in response to the detecting of the RLF, deciding on an action to be performed by the UE according to the information; and
performing, by the UE, the decided action,
wherein the decided action comprises at least one of triggering of a service request, triggering of a Tracking Area Update (TAU), and triggering of a Routing Area Update (RAU).

2. The method of claim 1, wherein the deciding on the action comprises deciding whether to initiate at least one of a service request, a TAU, and a RAU.

3. The method of claim 1, further comprising storing the information in the UE.

4. The method of claim 1, further comprising configuring the UE according to the information.

5. The method of claim 4, wherein the deciding on the action comprises deciding on an action according to the configuration of the UE.

6. The method of claim 1, wherein the sending of information comprises sending at least one of an ATTACH_ACCEPT message, a TRACKING_AREA_UPDATE_ACCEPT message, a ROUTING_AREA_UPDATE_ACCEPT message, a Globally Unique Temporary Identity (GUTI)_REALLOCA- TION_COMMAND message, a message from an eNB to the UE, and a Radio Resource Control (RRC) signalling message.

7. The method of claim 1, wherein the sending of information comprises sending at least one of a Short Messaging Service (SMS) message, and an Open Mobile Alliance Device Management (OMA DM) message.

8. A method of operating a communication system comprising a NetWork (NW) and a User Equipment (UE), a Non Access Stratum (NAS) via which the NW and the UE communicate with each other, and an Access Stratum (AS) providing a physical connection to enable the NAS communication between the NW and the UE to be achieved, the physical connection including a wireless radio link to the UE, the method comprising:

detecting a Radio Link Failure (RLF) by the AS;
    informing the NAS of the RLF;
    determining if a message is received by the UE regarding recovery by the NAS from the RLF;
    if it is determined that the message regarding recovery by the NAS from the RLF is received, determining if the received message indicates that recovery by the NAS from the RLF is permitted; and
    if it is determined that the recovery by the NAS from the RLF is permitted, performing a recovery from the RLF by the NAS.

9. The method of claim 8, wherein, if it is determined that the message regarding recovery by the NAS from the RLF is not received:

determining if UpLink (UL) data is to be sent by the UE; and
    if it is determined that the UL data is to be sent by the UE, recovering from the RLF.

10. The method of claim 8, wherein, if it is determined that the recovery by the NAS from the RLF is not permitted:

determining if UpLink (UL) data is to be sent by the UE; and
    if it is determined that the UL data is to be sent by the UE, recovering from the RLF.

11. The method of claim 8, wherein the determining if a message is received by the UE comprises:

determining if at least one of an ATTACH_ACCEPT message, a TRACKING_AREA_UPDATE (TAU)_ACCEPT message, a ROUTING_AREA_UPDATE (RAU)_ACCEPT message, a Globally Unique Temporary Identity (GUTI)_REALLOCATION_COMMAND message, a message from an eNB to the UE, and a Radio Resource Control (RRC) signalling message is received; and
    determining if the received at least one of the ATTACH_ACCEPT message, the TAU_ACCEPT message, the RAU_ACCEPT message, the GUTI_REALLOCATION_COMMAND message, the message from the eNB to the UE, and the Radio Resource Control (RRC) signalling message includes information regarding recovery from the RLF by the NAS.

* * * * *